United States Patent [19]

Habermeier et al.

[11] 4,286,097
[45] Aug. 25, 1981

[54] CARBOXYLIC ACID DIANHYDRIDES BASED ON TRIMELLITIC ANHYDRIDE

[75] Inventors: Jürgen Habermeier, Pfeffingen; Eduard Knecht; Rudolf Gisler, both of Basel, all of Switzerland

[73] Assignee: Ciba-Geigy Corporation, Ardsley, N.Y.

[21] Appl. No.: 58,224

[22] Filed: Jul. 16, 1979

[30] Foreign Application Priority Data

Jul. 28, 1978 [CH] Switzerland .......................... 8146/78

[51] Int. Cl.$^3$ ........................................... C07D 405/14
[52] U.S. Cl. ............................ 548/309; 260/30.4 EP; 548/310; 548/312
[58] Field of Search ................................ 548/309, 310

[56] References Cited

U.S. PATENT DOCUMENTS

| | | | |
|---|---|---|---|
| 3,293,248 | 12/1966 | Sheffer | 544/221 |
| 3,631,221 | 12/1971 | Batzer et al. | 548/309 X |
| 4,016,330 | 4/1977 | Laganis | 428/379 |
| 4,126,619 | 11/1978 | Darms et al. | 260/326 C |

FOREIGN PATENT DOCUMENTS 1304873 7/1966 United Kingdom .
1482068 8/1977 United Kingdom .

OTHER PUBLICATIONS

Sorenson, W., et al., *Preparative Methods of Polymer Chemistry*, Interscience, New York, 1968, pp. 153, 157, 158.
March, J., *Advanced Organic Chemistry*, McGraw Hill, New York, 1968, p. 320.
Loncrini, D., *J. Polymer Sci.*, A-1, 4, 1531 (1966).
Porret, D., et al., *Helv. Chim. Acta*, 54(6), 1695 (1971).

*Primary Examiner*—Richard A. Schwartz
*Attorney, Agent, or Firm*—Luther A. R. Hall

[57] ABSTRACT

Novel carboxylic acid dianhydrides are obtained by esterifying or trans-esterifying hydantoindiols, or diesters thereof, of the formula

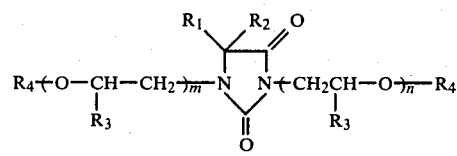

in which m and n are each a number from 1 to 4 and $R_1$ and $R_2$ are each an alkyl having 1 to 5 C atoms, or $R_1$ and $R_2$ together are the pentamethylene radical, $R_3$ is a hydrogen atom or methyl and $R_4$ is a hydrogen atom, acetyl or propionyl, with trimellitic anhydride.

The novel dianhydrides are valuable curing agents for epoxide resins and are suitable for the preparation of polymers which are derived from carboxylic acid dianhydrides.

5 Claims, No Drawings

CARBOXYLIC ACID DIANHYDRIDES BASED ON TRIMELLITIC ANHYDRIDE

The present invention relates to carboxylic acid dianhydrides based on trimellitic anhydride and hydantoindiols or hydantoindiol diesters, processes for their preparation and their use as curing agents for epoxide resins and for the preparation of polymers which are derived from carboxylic acid dianhydrides, for example polyimides.

Tetracarboxylic acid dianhydrides obtained using aliphatic or aromatic dihydroxy compounds, or the diester derivatives thereof, are known. Some of these products have been widely introduced industrially and are used to prepare polyimides or as curing agents for epoxide resins. Both types of application for the dianhydrides preferentially relate to the production of thin layers, especially an insulating lacquer coatings. Many of the known carboxylic acid dianhydrides, however, have the disadvantage that they themselves, or their first secondary products, are still soluble only in specific solvents and at relatively high temperatures. Thus, for example, prepolymers based on aromatic tetracarboxylic acid dianhydrides, the preparation of which is described in "Journal of Polymer Science", Part A-1, 4, page 1,531 et seq., (1966), are soluble only in aprotic solvents, such as dimethylformamide, dimethylacetamide and N-methyl-2-pyrrolidone. The object of the invention was, therefore, to provide novel dianhydrides which are themselves readily soluble in ecologically harmless solvents, or have intermediates which are readily soluble in these solvents, and which have good compatibility with commonly used epoxide resins.

It has been found that carboxylic acid dianhydrides based on trimellitic anhydride and hydantoindiol diesters do not have the disadvantages described above and, because of their advantageous characteristics, are particularly suitable for use in the field of surface protection. Protective coatings which adhere well, are highly elastic and very stable to organic acids and, moreover, have good deformability and stability to sterilisation can be produced on metals from the dianhydrides according to the invention in combination with the commonly used epoxide resins.

The present invention thus relates to novel dianhydrides of the formula I

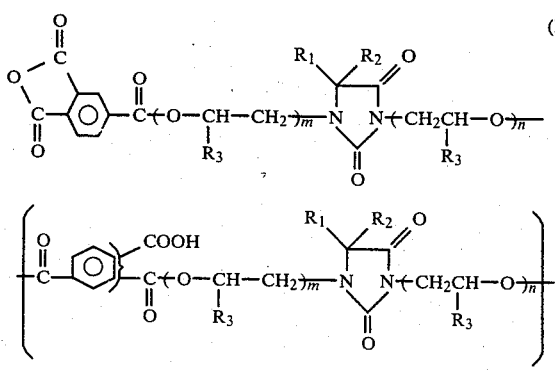

(I)

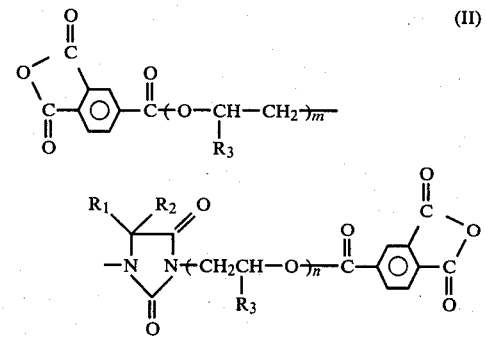

or mixtures thereof, in which formula x is nought or a number from 1 to 10, preferably nought or a number from 1 to 3, m and n are each a number from 1 to 4 and $R_1$ and $R_2$ are each an alkyl having 1 to 5 C atoms, or $R_1$ and $R_2$ together are the pentamethylene radical, and $R_3$ is a hydrogen atom or methyl.

Preferably, in the formula I, x is nought or a number from 1 to 3, m and n are each 1 or 2, $R_1$ and $R_2$ are each methyl and $R_3$ is a hydrogen atom or methyl, especially a hydrogen atom.

Dianhydrides of particular interest are those of the formula II (II)

in which m and n are each a number from 1 to 4 and $R_1$ and $R_2$ are each an alkyl having 1 to 5 C atoms, or $R_1$ and $R_2$ together are the pentamethylene radical, and $R_3$ is a hydrogen atom or methyl.

Preferably, in the formula II, m and n are each 1 or 2, $R_1$ and $R_2$ are each methyl and $R_3$ is a hydrogen atom or methyl, especially a hydrogen atom.

The compounds of the formula I can be prepared by esterifying or trans-esterifying x+1 mols of a hydantoindiol or of a diester thereof, of the formula III

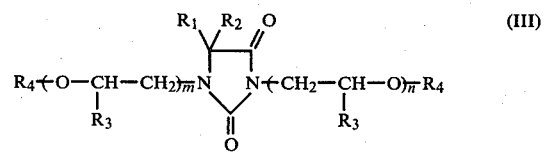

(III)

or of mixtures thereof, in which formula $R_1$, $R_2$, $R_3$, m and n are as defined in formula I and the two $R_4$'s are each a hydrogen atom, acetyl or propionyl, with x+2 mols of trimellitic anhydride, if desired in the presence of a catalyst, to give compounds of the formula I.

The hydantoindiols of the formula III are known compounds and can be prepared by the process described in "Helvetica Chimica Acta" 54, (6), 1971, page 1,695 et seq., by adding m+n mols of ethylene oxide or propylene oxide onto hydantoins disubstituted by alkyl in the 5,5-position.

The diesters of the formula III can be prepared easily by processes which are well known and widely used. Thus, for example, the diacetate can be prepared from 1,3-di-(hydroxyethyl)-5,5-dimethylhydantoin by reacting this diol with acetic anhydride in excess at the boil. The product is isolated by distilling off the excess acetic anhydride and the acetic acid formed. For purification, the diacetate can be distilled in vacuo.

Preferably, 1 mol of a compound of the formula III is used as the starting material for the preparation of the compounds according to the invention and this is reacted with 2 mols of trimellitic anhydride, to give compounds of the formula III.

The trans-esterification of the diesters of the formula III with trimellitic anhydride is carried out at between 100° and 300° C. and preferably at between 150° and 250° C., if the reaction is carried out without catalysts. If the conventional trans-esterification catalysts are used, the reaction is carried out at between 100° and 220° C. Examples of such catalysts are: calcium acetate, manganese acetate, zinc acetate, lead acetate, tetraisopropyl orthotitanate and the like, and mixtures thereof.

The course of the reaction can be followed with the aid of the acetic acid or propionic acid which is eliminated and distilled off.

Without the use of catalysts, the reaction is ended in 5–7 hours.

When a diol of the formula III is esterified with trimellitic anhydride, the dianhydrides of the formula I or II are obtained as virtually the sole product, depending on the temperature, the reaction time and the catalyst employed. The anhydride mixtures can still contain molecules with free carboxyl groups, as by-products. The direct esterification without catalysts at between 100° and 250° C. takes place in 5 to 7 hours. Preferably, the reaction is carried out at 160° to 225° C., without a catalyst and under reduced pressure. If catalysts are used, the reaction is carried out at 140° to 220° C. and the catalysts employed can again be those mentioned for the trans-esterification. The esterification reaction is followed by titration of the acid equivalents, which increase.

The compounds according to the invention can also be prepared by reacting the diols of the formula III with trimellitic anhydride-chloride, with the elimination of hydrogen chloride.

A further possibility for the preparation of compounds according to the invention comprises the trans-esterification of a trimellitic anhydride-aklyl ester, for example trimellitic anhydride-methyl ester, with the diols of the formula III.

The novel dianhydrides or mixtures of dianhydrides melt in the range of 50° to 120° C. and are colourless to yellow or pale brown coloured products. The novel compounds have good solubility characteristics and can be dissolved easily in the solvents customarily used for lacquers, such as ethylglycol acetate, dioxan, acetone, chloroform and the like.

In addition to the good solubility characteristics, the dianhydrides according to the invention also have an advantageous melting range as anhydride curing agents and good compatibility with the epoxide resins commonly used. They can therefore be processed easily with, for example, solid and liquid epoxide resins based on bisphenol A, bisphenol F, hydrogenated bisphenol A, hydantoins, cyanuric acid and dicarboxylic acids.

As mentioned initially, the compounds according to the invention can also be used to prepare polymers which are derived from dianhydrides, such as polyamidoacids, polyimides or polyester-amide-imides.

PREPARATION EXAMPLES

Example 1

192 g (1.0 mol) of trimellitic anhydride are melted at 180° C. 108 g (0.5 mol) of industrially produced 1,3-di-(2′-hydroxyethyl),5,5-dimethylhydantoin are added dropwise to the melt in the course of 50 minutes, with stirring. The temperature is raised to 205° C. during this addition. The reaction mixture is then stirred for about a further 5 hours at 220° C., the condensation reation being carried out under reduced pressure (1 bar→195 mbars). The esterification reaction proceeds at a uniform rate and about 15 ml of water can be isolated. 1 hour after the start of the reaction, a sample taken from the batch contains 0.75 anhydride group equivalent/kg and 5.6 acid group equivalents/kg. At the end of the reaction, the product has 2.75 anhydride group equivalents/kg and then only 1.6 acid group equivalents/kg. The reaction product melts at 78° C. (Kofler); 260 g of the substance are obtained. A 50% solution of the product in ethylglycol acetate has a viscosity of 250 mPa.s at 25° C.

COMPARISON EXAMPLE

In accordance with "Journal of Polymer Science" A-1, 1966, page 1,531 et seq., 0.5 mol of 1,4-phenylene diacetate and 1.0 mol of trimellitic anhydride are reacted. The crude, dark-coloured dianhydride, or the mixture containing the dianhydride, which is thus obtained has an anhydride content of 3.77 equivalents/kg and an acid content (from the impurities) of 1.55 equivalents/kg. This product softens at about 100° C.

For suitable comparison with the anhydride product prepared according to Example 1, the anhydride product prepared according to "Journal of Polymer Science" was not further purified. Moreover, the impurities, i.e. by-products with free carboxyl groups, have a positive influence on the solubility of the anhydride product.

| | Product according to the Comparison Example | Product according to Example 1 |
| --- | --- | --- |
| Solubility in ethylglycol acetate at 50° C. | only traces of the product soluble and these reprecipitate on cooling to 20° C. | very readily soluble |
| Stability of a 50% solution in ethylglycol acetate at room temperature | not possible to prepare a 50% solution - even hot (unstable) | 50% solution stable on storage for more than 6 weeks at 20° C. |

This comparison shows that the products disclosed in the "Journal of Polymer Science" are completely unsuitable for lacquer applications as curing agents for epoxide resins, since it is not possible to bring the requisite amount of curing agent into solution in a lacquer solvent at all.

EXAMPLE 2

A mixture of 148 g (0.5 mol) of 1,3-di-(acetoxyethyl)-5,5-dimethylhydantoin and 192 g (1.0 mol) of trimellitic anhydride is stirred at 220° C. for 1 hour. The acetic acid formed during the trans-esterification is then distilled off from the batch in the course of 7 hours at 235°–240° C. under 325–520 mbars; about 40 ml of acetic acid can be isolated.

The reaction product (yield: 270 g) melts at 65.0° C. and has an anhydride content of 2.8 anhydride group equivalents/kg. A 50% solution in ethylglycol acetate has a viscosity of 50 mPa.s at 25° C.

100 g of the reaction product obtained above are recrystallised, once from ethylglycol acetate and once from chloroform. This yields 70 g of colourless crystals with the following properties: Softening point (according to Kofler): 114°–117° C. Anhydride content: 3.25 equivalents/kg (91.7% of theory)

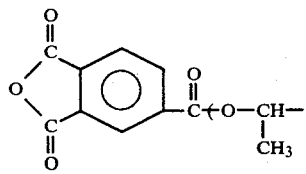 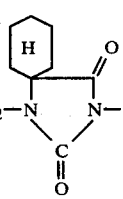 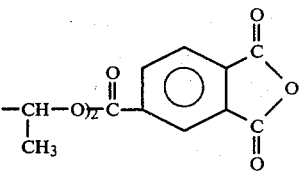

| Elementary analysis (C$_{27}$H$_{20}$N$_2$O$_{12}$) | |
|---|---|
| found: | calculated: |
| 4.90% N | 4.96% N |
| 57.20% C | 57.43% C |

According to H—NMR spectrum analysis (60 Mc), the product has the structure shown below:

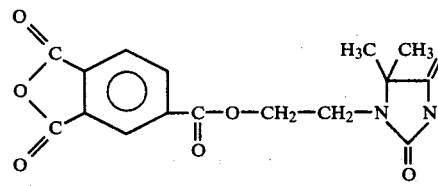 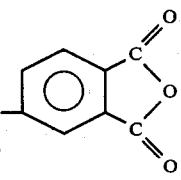

EXAMPLE 3

Mixture of dianhydrides obtained from 1,3-di-(2-hydroxyethyl)-5,5-dimethylhydantoin and trimellitic anhydride.

The procedure is precisely as in Example 1 except that in this case 216 g (1 mol) of technical grade 1,3di-(2hydroxyethyl)-5,5-dimethylhydantoin are reacted with 288 g (1.5 mols) of trimellitic anhydride.

The reaction product thus obtained is a hard resin which has a softening point (Kofler) of 95°–105° C. The mixture of dianhydrides contains 2.14 equivalents/kg of anhydride groups and 1.0 equivalent/kg of carboxyl groups. A 50% solution of the substance in ethylglycol acetate has a viscosity of 825 mPa.s at 25° C.

EXAMPLE 4

A mixture of dianhydrides obtained from 2 mols of trimellitic anhydride and 1 mol of an adduct of 1 mol of 1,3-di-(2-hydroxyethyl)-5,5-pentamethylenehydantoin with 4 mols of propene oxide.

2 mols (384 g) of trimellitic anhydride are reacted with 1 mol of the adduct of 1 mol of 1,3-di-(2-hydroxyethyl)-5,5-pentamethylenehydantoin and 4 mols of propene oxide by the method of Example 1.

A hard, brittle mixture of dianhydrides is obtained which has an anhydride content of 1.4 equivalents/kg (59.3% of theory). This product softens (Kofler) at 80°–100° C. A 50% solution in ethylglycol acetate has a viscosity of 240 mPa.s at 25° C.

The product contains an anhydride-containing molecule of the following structure as the main constituent:

USE EXAMPLES

EXAMPLE A

A mixture of 100 g of an epoxide resin which has been prepared from bisphenol A and has an epoxide content of 1.0 epoxide equivalent/kg and 14.1 g of the mixture of dianhydrides prepared according to Example 1 is dissolved in ethylglycol acetate to give a 50% lacquer solution. This clear lacquer is applied to sheets of tin plate (E 1) by means of a coater and baked for 10 minutes at 190° C. 8 micron and 20 micron thick coatings are produced in this way.

The 20 micron thick coatings are used to determine the hardness:

Persoz hardness (seconds): 355

The 8 micron thick coatings were tested to determine the mechanical properties and stability to chemicals (assessment according to DIN 53,230; Rating 0=best value=lacquer unchanged, Rating 5=lacquer totally destroyed).

| | | |
|---|---|---|
| Cup deep-drawing (deformability) | = 1 | (good) |
| Acetone rubbing test (20 ×) | = 0 | (very good) |
| Stability to sterilisation with H$_2$O (1 hour/120° C.) | = 0 | (very good) |
| 2% acetic acid (6 hours/98° C.) | = 2 | (satisfactory) |
| 5% acetic acid/2% tartaric acid (6 hours/98° C.) | = 2 | (satisfactory) |

In addition to the high hardness, the excellent deep-drawing characteristics and the good stability to acids over a period of 6 hours at 98° C. are striking in the case of the coatings obtained.

EXAMPLE B 100 g of the epoxide resin used in Example A and 12.6 g of the dianhydride prepared according to Example 2, in the form of the crude product, are dissolved in ethylglycol acetate to give a 50% lacquer solution. This clear lacquer is applied to sheets of tin plate (E 1) by means of a coater and then baked for 10 minutes at 190° C. The 8 micron thick and 20 micron thick, completely clear coatings thus obtained are tested as described in Example A to determine the properties of interest from the point of view of lacquer technology (assessment according to DIN 53,230).

| | | |
|---|---|---|
| Persoz hardness (seconds):360 | | |
| Cup deep-drawing (deformability) | = 0 | |
| Stability to sterilisation with | | |
| H$_2$O (1 hour/120° C.) | = 0 | |
| Stability of the previously deep-drawn cups to sterilisation with | | |
| H$_2$O (1 hour/120° C.) | = 3 | (adequate) |
| 2% acetic acid (6 hours/98° C.) | = 1 | |
| 5% acetic acid/2% tartaric acid (6 hours/98° C.) | = 1 | |

In the case of these coatings also, the excellent hardness coupled with outstanding deep-drawability and good resistance to chemicals is to be singled out.

What is claimed is:

1. A dianhydride of the formula I in which formula x is nought or a number from 1 to 10, m and n are each a number from 1 to 4 and R$_1$ and R$_2$ are each an alkyl having 1 to 5 C atoms, or R$_1$ and R$_2$ together are the pentamethylene radical, and R$_3$ is a hydrogen atom or methyl.

2. A dianhydride according to claim 1, in which, in the formula I, x is nought or a number from 1 to 3.

3. A dianhydride according to claim 1, in which, in the formula I, x is nought or a number from 1 to 3, m and n are each 1 or 2, R$_1$ and R$_2$ are each methyl and R$_3$ is a hydrogen atom or methyl.

4. A dianhydride according to claim 1, of the formula II in which m and n are each a number from 1 to 4 and R$_1$ and R$_2$ are each an alkyl having 1 to 5 C atoms, or R$_1$ and R$_2$ together are the pentamethylene radical, and R$_3$ is a hydrogen atom or methyl.

5. A dianhydride according to claim 4, in which, in the formula II, m and n are each 1 or 2, R$_1$ and R$_2$ are each methyl and R$_3$ is a hydrogen atom or methyl.

* * * * *